United States Patent
Hyun

(10) Patent No.: US 8,308,097 B2
(45) Date of Patent: Nov. 13, 2012

(54) CLICK SOUND GENERATING DEVICE FOR BAIT REEL

(75) Inventor: Kwang-Ho Hyun, Bucheon (KR)

(73) Assignee: Doyo Engineering Co., Ltd. (KR)

( * ) Notice: Subject to any disclaimer, the term of this patent is extended or adjusted under 35 U.S.C. 154(b) by 323 days.

(21) Appl. No.: 12/838,644

(22) Filed: Jul. 19, 2010

(65) Prior Publication Data

US 2011/0108651 A1 May 12, 2011

(30) Foreign Application Priority Data

Nov. 9, 2009 (KR) .................. 10-2009-0107373

(51) Int. Cl.
*A01K 89/01* (2006.01)
(52) U.S. Cl. ................. 242/296; 242/306; 242/317
(58) Field of Classification Search ............. 242/296, 242/306, 286, 309, 317
See application file for complete search history.

(56) References Cited

U.S. PATENT DOCUMENTS

| | | | | |
|---|---|---|---|---|
| 1,899,914 A | * | 2/1933 | Pflueger | 242/308 |
| 4,728,054 A | * | 3/1988 | Pisapio | 242/258 |
| 4,796,828 A | * | 1/1989 | Councilman | 242/245 |
| 4,813,626 A | * | 3/1989 | Sakumoto | 242/245 |
| 5,590,847 A | * | 1/1997 | Ament | 242/317 |
| 5,609,309 A | * | 3/1997 | Oh | 242/282 |
| 5,918,826 A | * | 7/1999 | Arkowski | 242/295 |
| 6,039,279 A | * | 3/2000 | Datcuk et al. | 242/296 |
| 6,296,200 B1 | * | 10/2001 | Chang | 242/317 |
| 6,382,545 B1 | * | 5/2002 | Yeh | 242/317 |
| 7,552,886 B2 | * | 6/2009 | Kim et al. | 242/246 |
| 2009/0014573 A1 | * | 1/2009 | Kim et al. | 242/255 |

FOREIGN PATENT DOCUMENTS

| | | |
|---|---|---|
| JP | 2009-034005 | 2/2009 |
| KR | 10-2005-0108098 | 11/2005 |
| KR | 10-0665068 | 12/2006 |

* cited by examiner

*Primary Examiner* — Emmanuel M Marcelo
(74) *Attorney, Agent, or Firm* — Cantor Colburn LLP

(57) ABSTRACT

Disclosed herein is a click sound generating device for a bait reel. The bait reel includes a reel frame, a spool, a handle and a drag knob. The spool is rotatably mounted to the reel frame. A fishing line is wound around the circumferential outer surface of the spool. The handle is connected to the spool through a gear shaft. The drag knob is provided between the handle and the gear shaft to adjust the drag strength of the spool. The click sound generating device is in the drag knob and generates clicking sounds depending on rotation of the drag knob, thus enabling a user to minutely and precisely control the drag strength or rotating force of the spool.

10 Claims, 14 Drawing Sheets

CLICK SOUND GENERATING DEVICE FOR BAIT REEL

BACKGROUND OF THE INVENTION

1. Field of the Invention

The present invention relates generally to click sound generating devices for bait reels and, more particularly, to a click sound generating device in which a click spring and a click plate are installed in a drag knob or a tension knob to enable a user to minutely and precisely control the drag strength or rotating force of a spool.

Furthermore, the present invention provides the click sound generating device which is configured such that a change of the structure of an existing bait reel is minimized and the assembly and manufacture of the bait reel with the click sound generating device is facilitated, thus enhancing the price competitive power, and which can provide cheerful clicking sounds, thereby increasing the exquisite joy of fishing.

2. Description of the Related Art

In typical techniques pertaining to star drag knobs of well known bait casting reels used for fishing, a drive gear engaging with a pinion of a spool shaft is provided on a gear shaft so that it can idle.

A leather drag washer is fitted over the gear shaft and is removably brought into close contact with the outer surface of the drive gear.

Depending on the degree to which the drag knob screwed to the upper end of the gear shaft is tightened, the drag washer is brought into close contact with the drive gear or is moved away from the drive gear.

When the drag washer is brought into close contact with the drive gear, the rotating force of the gear shaft is transmitted to the drive gear so that the drive gear rotates.

When the drag washer is moved away from the drive gear, the transmission of the rotating force of the gear shaft is interrupted.

Furthermore, the rotating force transmitted to the drive gear from the gear shaft is adjusted depending on the intensity with which the drag washer is brought into contact with the drive gear by tightening the drag knob. Thereby, the reeling force of the bait reel can be controlled.

In addition, a metal drag washer which covers the entire surface of the leather drag washer, a spring washer which elastically pushes the washers, a bushing, another washer, a bearing and another washer are fitted over the shaft and arranged in order beside the outer surface of the leather drag washer. Thereafter, the star drag knob is screwed to the shaft, and a handle arm is coupled to the drag knob by a handle nut.

In the typical technique, when tightening or loosening the star drag knob screwed to the gear shaft to adjust the reeling force of the bait reel, a user adjusts the reeling force depending only on sensing the degree with which the drag knob rotates in a threaded manner. Therefore, it is very difficult to minutely adjust the reeling force. Moreover, the user is forced to pay the utmost attention so that the reeling force can be precisely adjusted.

In an effort to overcome the above-mentioned problems, a device for generating clicking sounds to facilitate precise adjustment of the rotating force of a drive gear and enhance the exquisite joy of fishing was proposed in Korean Patent Registration No. 0547269 (date: Jan. 20, 2006) which was filed by Banax Co., Ltd. and entitled "Click sound generating device for fishing reel".

This device of No. 0547269 is configured such that a user can turn on/off the operation of generating clicking sounds.

However, the structure of the device is complex, resulting in reducing the assemblability and productivity. In addition, minor malfunctions are common.

Meanwhile, another click sound generating device was proposed in Korean Patent Registration No. 0665068 (date: Dec. 28, 2006) which was filed by Hyupsung Precision Ind. Co. and entitled "Reel for fishing". The click sound generating device includes a click pin which is elastically supported by a coil spring type click spring. Click grooves are formed in a drag plate that is rotated by rotation of a main shaft. Thus, when the drag plate rotates, the click pin repetitively collides with the click grooves of the drag plate, thus generating clicking sounds.

However, the click sound generating device of No. 0665068 also has a complex structure, so that a process of assembling the device is complicated and minor malfunctions are common.

A technique similar to the device of No. 0665068 was proposed in Japanese Patent Laid-open Publication No. 2009-34005 (date: Feb. 19, 2009) which was filed by Daiwa Precision Ind. Co. However, this technique also has the same problems.

SUMMARY OF THE INVENTION

Accordingly, the present invention has been made keeping in mind the above problems occurring in the prior art, and an object of the present invention is to provide a click sound generating device which generates clicking sounds depending on rotation of a drag knob which controls the drag strength of a spool, thus enabling a user to minutely and precisely control the drag strength or rotating force of the spool.

Another object of the present invention is to provide a click sound generating device in which a click spring and a click plate are installed in the drag knob or tension knob to generate clicking sounds so that the user can minutely and precisely control the drag strength or rotating force of the spool, and which is configured such that a change of the structure of an existing bait reel is minimized and the assembly and manufacture of the bait reel with the click sound generating device is facilitated, thus enhancing the price competitive power, and which can use even the components of existing reels without modifying the structure thereof, thereby maximizing the price competitive power, and facilitating inventory management.

In order to accomplish the above object, the present invention provides a click sound generating device for a bait reel. The bait reel includes a reel frame, a spool rotatably mounted to the reel frame, with a fishing line wound around a circumferential outer surface of the spool, a handle connected to the spool through a gear shaft, and a drag knob provided between the handle and the gear shaft to adjust a drag strength of the spool. The click sound generating device is installed in the drag knob to generate clicking sounds depending on rotation of the drag knob and includes a click spring, a click plate, a means for holding the click spring and a means for retaining the click plate. The click spring is interlocked with the drag knob or the gear shaft, with a contact protrusion formed on the click spring. The click spring has an annular shape with a center opening so that the click spring is provided around a circumferential outer surface of the gear shaft through the center opening. The click plate is interlocked with the gear shaft or the drag knob. The click plate has an uneven surface having a crown gear shape to generate clicking sounds when the contact protrusion of the click spring comes into contact with and moves along the uneven surface of the click plate.

The click plate has a center hole so that the click plate is fitted over the circumferential outer surface of the gear shaft through the center hole.

The click spring may be interlocked with the drag knob, and the click plate may be interlocked with the gear shaft. The means for holding the click spring may comprise a spring holder mounted to the drag knob.

The spring holder may be integrated with the click spring and surround a circumferential outer surface of the click spring.

The click spring may be interlocked with the gear shaft, and the click plate may be interlocked with the drag knob. The means for holding the click spring may comprise a spring holder mounted to the gear shaft.

The gear shaft may have a planar surface portion and a longitudinal slot. The click plate or the spring holder that is interlocked with the gear shaft may have a linear portion corresponding to the planar surface portion and a stop protrusion corresponding to the longitudinal slot. The linear portion and the stop protrusion may be formed in the center hole of the click plate or a center hole of the spring holder.

In order to accomplish the above object, the present invention provides a click sound generating device for a bait reel. The bait reel includes a reel frame, a spool rotatably mounted to the reel frame, with a fishing line wound around a circumferential outer surface of the spool, a side cover assembled to a sidewall of the reel frame, and a tension knob provided on the side cover, the tension knob applying tension to a spool shaft to adjust a speed at which the spool rotates. The click sound generating device is installed in the tension knob to generate clicking sounds depending on rotation of the tension knob, and includes a click spring, a click plate, a means for holding the click spring and a means for retaining the click plate. The click spring is interlocked with the tension knob or maintained in a stationary state when the tension knob rotates, with a contact protrusion formed on the click spring. The click spring has an annular shape with a center opening so that the click spring is provided around a circumferential outer surface of the spool shaft through the center opening. The click plate is maintained in a stationary state or interlocked with the tension knob when the tension knob rotates. The click plate has an uneven surface having a crown gear shape to generate clicking sounds when the contact protrusion of the click spring comes into contact with and moves along the uneven surface of the click plate. The click plate has a center hole so that the click plate is fitted over the circumferential outer surface of the spool shaft through the center hole.

The click spring may be interlocked with the tension knob, and the click plate may be maintained in the stationary state. The means for holding the click spring may comprise a spring holder mounted to the tension knob.

The spring holder may be integrated with the click spring and surround a circumferential outer surface of the click spring.

The click spring may be maintained in the stationary state, and the click plate may be interlocked with the tension knob. The means for holding the click spring may comprise a spring holder mounted to the side cover.

The click sound generating device may further include a retaining member coupled to the side cover. The retaining member may have a stop hole therein. The click plate or the spring holder may have a stop protrusion corresponding to the stop hole of the retaining member so that the click plate or the spring holder is maintained in the stationary state regardless of the rotation of the tension knob.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
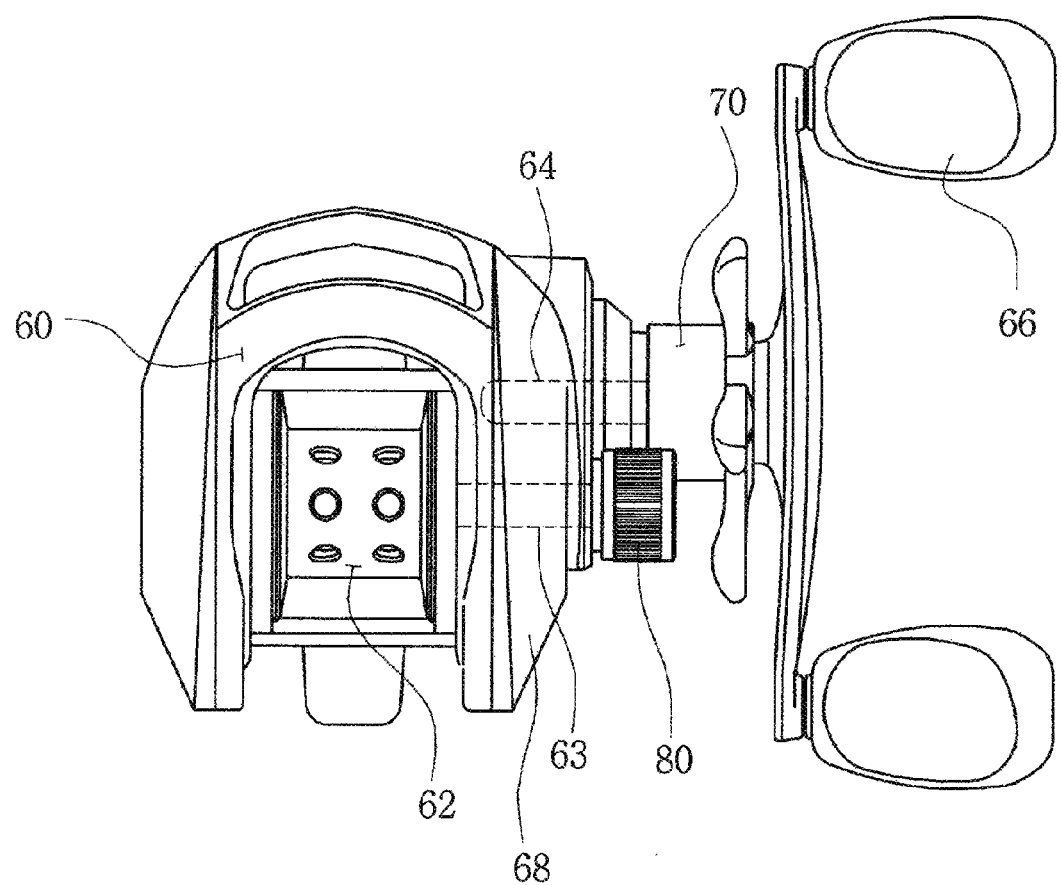
FIG. 1 is a view showing the external construction of a bait reel, according to the present invention.

Hereinafter, the present invention will be described in detail with reference to the attached drawings.

This invention may, however, be embodied in many different forms, and should not be construed as limited to the embodiments set forth herein. Rather, all changes that fall within the bounds of the present invention, or the equivalence of the bounds are therefore intended to be embraced by the present invention.

The same reference numerals throughout the drawings, that is, the same reference numerals for the second digit or the first digit, or for the second digit, the first digit and a letter of the alphabet, denote elements having the same function. If not specifically mentioned otherwise, the elements denoted by the reference numerals are to be assumed to comply with the above-mentioned reference scheme.

In the drawings, the thicknesses of lines or the sizes of elements may be exaggerated or simplified to more clearly and conveniently illustrate the present invention, but the bounds of the present invention must not be interpreted as being limited thereto.

The terminology used herein is for the purpose of describing particular embodiments only and is not intended to be limiting. As used herein, the singular forms "a," "an" and "the" are intended to include plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The ordinal numerals "first", "second", "third", etc. are used only for the sake of description and they categorically do not impose a limit on the order of production.

FIG. 1 is a view showing the entire construction of a bait reel for fishing according to the present invention.

As shown in FIG. 1, the bait reel for fishing according to the present invention includes a reel frame 60, a spool 62, a handle 66, a drag knob 70, a side cover 68 and a tension knob 80. The spool 62 is rotatably mounted to the reel frame 60. A fishing line is wound around the spool 62. The handle 66 is coupled to the spool 62 through a gear shaft 64. The drag knob 70 is provided between the handle 66 and the gear shaft 64 to adjust the drag strength of the spool 62. The side cover 68 is assembled to the sidewall of the rear frame 60. The tension knob 80 is provided on the side cover 68 and applies tension to a spool shaft 63 to adjust the speed at which the spool 62 rotates.

Meanwhile, a click sound generating device proposed in the present invention is installed in the drag knob 70 or the tension knob 80.

The click sound generating device according to the present invention is a means for minutely and precisely controlling the drag strength of the spool 62 or the rotation speed of the spool 62 in such a way that a click sound is generated corresponding to the rotation of the drag knob 71 or the tension knob 80.

Below, nine types of representative embodiments of the construction of the click sound generating device will be described in detail. FIGS. 2 through 7 illustrate a group of embodiments in which a click sound generating device is installed in the drag knob 70. FIGS. 8 through 14 illustrate a group of embodiments in which a click sound generating device is installed in the tension knob 80.

FIRST EMBODIMENT

Figure 2:
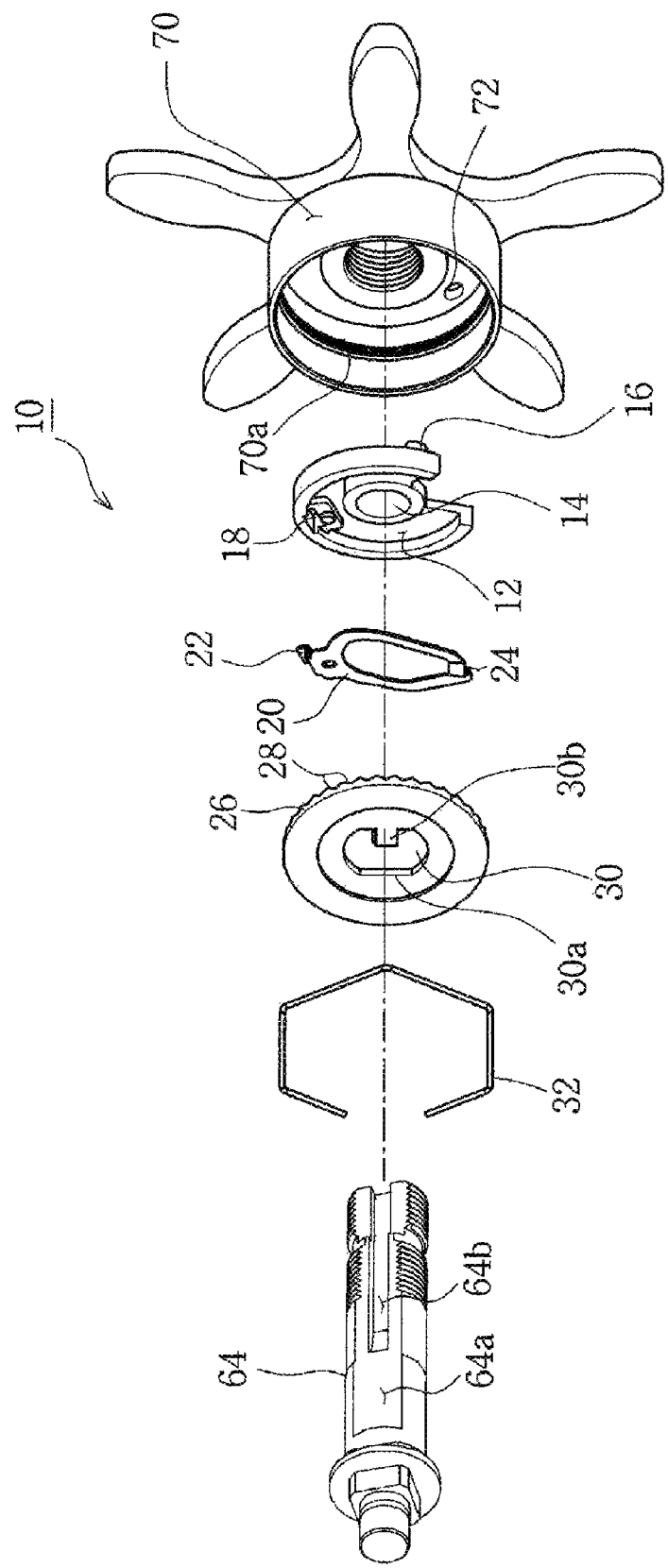
FIG. 2 is an exploded perspective view showing the construction of a click sound generating device installed in a drag knob of a bait reel, according to a first embodiment of the present invention.
Figure 3:
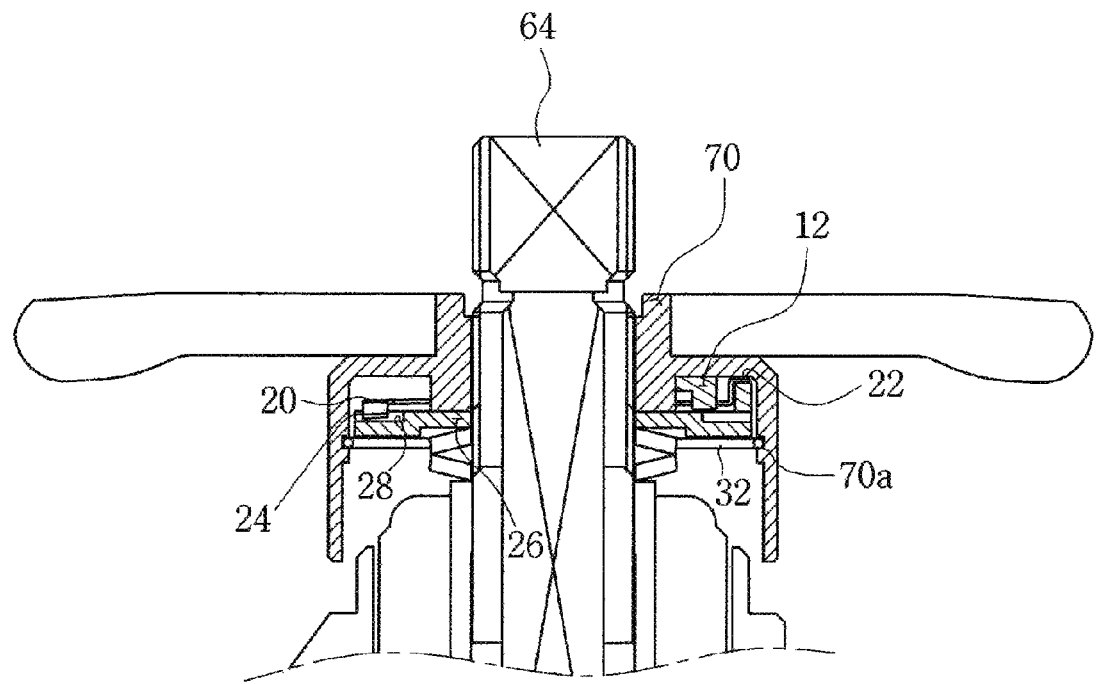
FIG. 3 is a sectional view of FIG. 2.

FIG. 2 is an exploded perspective view showing the construction of a click sound generating device 10 of a bait reel for fishing, according to a first embodiment of the present invention. FIG. 3 is a sectional view of FIG. 2.

The click sound generating device 10 according to the first embodiment of FIGS. 2 and 3 is configured such that a spring holder 12 and a click spring 20 are fastened to the drag knob 70, so that when the spring holder 12 and the click spring 20 are rotated by rotating the drag knob 70, clicking sounds are generated by friction between the click spring 20 and a click plate 26 which is stationary relative to the click spring 20.

As shown in FIGS. 2 and 3, the click sound generating device 10 according to the first embodiment includes the spring holder 12, the click spring 20, the click plate 26 and a removal prevention ring 32.

The spring holder 12, which functions as a means for holding the click spring 20, is fastened to the inner surface of the drag knob 70.

In detail, a center hole 14 is formed through a central portion of the spring holder 12 so that a gear shaft 64 is inserted through the center hole 14. A stopper 16 protrudes from a first side of the spring holder 12. The stopper 16 is inserted into an insert hole 72 formed in the inner surface of the drag knob 70 so that the spring holder 12 can rotate along with the drag knob 70. In addition, a locking hole 18 is formed in a second side of the spring holder 12. A locking protrusion 22 of the click spring 20 is fitted into the locking hole 18, and the click spring 20 is thereby fastened to the spring holder 12.

The click spring 20 has an annular shape having a center opening such that it is provided around the circumferential outer surface of the gear shaft 64 (in the case of the embodiments of FIGS. 8 through 14, it is provided around a circumferential outer surface of a spool shaft 63). This is applied in common to the nine kinds of embodiments shown in FIGS. 2 through 14.

The click spring 20 which is fastened to the spring holder 12 rotates in one direction depending on the rotation of the drag knob 70 and thus generates clicking sounds.

The locking protrusion 22 having a stepped shape is provided on a first side of the click spring 20. The click spring 20 is fastened to the spring holder 12 by fitting the locking protrusion 22 into the locking hole 18 of the spring holder 12.

Furthermore, a contact protrusion 24 is provided on a second side of the click spring 20. The contact protrusion 24 is maintained in a state of being in elastic contact with an uneven surface 28 which is formed on a first side of the click plate 26. When the click spring 20 is rotated by the rotation of the spring holder 12, the contact protrusion 24 elastically moves along and snaps on the uneven surface 28, thereby generating clicking sounds.

The click plate 26 includes the uneven surface 28 having a crown gear shape to generate clicking sounds when the contact protrusion 24 moves along the uneven surface 28. The click plate 26 has a center hole 30 so that the click plate 26 is fitted over the circumferential outer surface of the gear shaft 64 through the center hole 30. The structure of the click plate 26 is applied in common to the nine embodiments shown in FIGS. 2 through 14.

In this specification, the term "being fitted over the shaft" strictly means "providing a structure capable of using the existing gear shaft 64 to minimize the change made to the structure of the conventional bait reel", rather than meaning "being in contact with the shaft and interlocking with the shaft".

As shown in FIGS. 2 and 3, the first side of the click plate 26 which is fitted over the gear shaft 64 is in elastic contact with the contact protrusion 24 of the click spring 20.

The center hole 30 into which the gear shaft 64 is fitted is formed through the central portion of the click plate 26. A linear portion 30a is formed on a portion of the circumferential inner edge of the center hole 30. The linear portion 30a corresponds to a planar surface portion 64a formed on the circumferential outer surface of the gear shaft 64, so that when the star drag knob 70 rotates, the click plate 26 is maintained in the state of having been fastened to the gear shaft 64 rather than rotating along with the star drag knob 70 (although the drag knob 70 is typically called a "star drag knob" due to a shape having five radial protrusions, the present invention should not be limited thereto). Furthermore, the uneven surface 28 is formed on the perimeter of the first side of the click plate 26 so that the contact protrusion 24 of the click spring 20 comes into elastic contact with the uneven surface 28 and elastically moves along the uneven surface 28 to generate clicking sounds. In other words, when the contact protrusion 24 rotates along the uneven surface 28, the contact protrusion 24 repetitively strikes the uneven surface 28 by the elastic force of the click spring 20, thus generating clicking sounds. To provide the elastic force, the click spring 20 is curved to form a shape similar to that of a spring washer, rather than having a planar shape. This structure of the click spring 20 is applied in common to the embodiments shown in FIGS. 2 through 14.

A stop protrusion 30b is provided on the circumferential inner edge of the center hole 30 of the click plate 26. A longitudinal slot 64b is formed in a portion of the outer surface of the gear shaft 64. Thus, when the gear shaft 64 is fitted into the center hole 30 of the click plate 26, the stop protrusion 30b is inserted into and locked to the longitudinal slot 64b. Thereby, even though the star drag knob 70 is rotating, the click plate 26 can be maintained in the state of having been fastened to the gear shaft 64 rather than rotating along with the star drag knob 70.

The planar surface portion 64a and the longitudinal slot 64b of the gear shaft 64, and the linear portion 30a and the stop protrusion 30b of the click plate 26 that correspond to the portion 64a and the slot 64b are used as a means for holding the click plate 26 on the gear shaft 64.

This structure used as the means for holding the click plate 26 is applied in common to the first through fourth embodiments shown in FIGS. 2, 4, 5 and 6.

Meanwhile, the removal prevention ring 32 functions to prevent the click spring 20, the spring holder 12 and the click plate 26 from being removed from the drag knob 70.

The removal prevention ring 32 is applied not only to the first through fourth embodiments shown in FIGS. 2, 4, 5 and 6 but also to the sixth through ninth embodiments shown in FIGS. 8, 12, 13 and 14.

In detail, the removal prevention ring 32 is locked to a locking groove 70a which is formed in the circumferential inner surface of the star drag knob 70 and thus holds the spring holder 12, the click spring 20 and the click plate 26 such that they can be prevented from being undesirably removed from the drag knob 70.

In the click sound generating device 10 according to the first embodiment having the above-mentioned construction, when a user rotates the drag knob 70, the spring holder 12 fastened to the drag knob 70 and the click spring 20 fastened to the spring holder 12 are rotated along with the drag knob 70. At this time, the contact protrusion 24 formed on the click spring 20 elastically moves along the uneven surface 28 of the click plate 26 which is firmly fitted over the gear shaft 64. Thereby, clicking sounds are generated.

Figure 4:
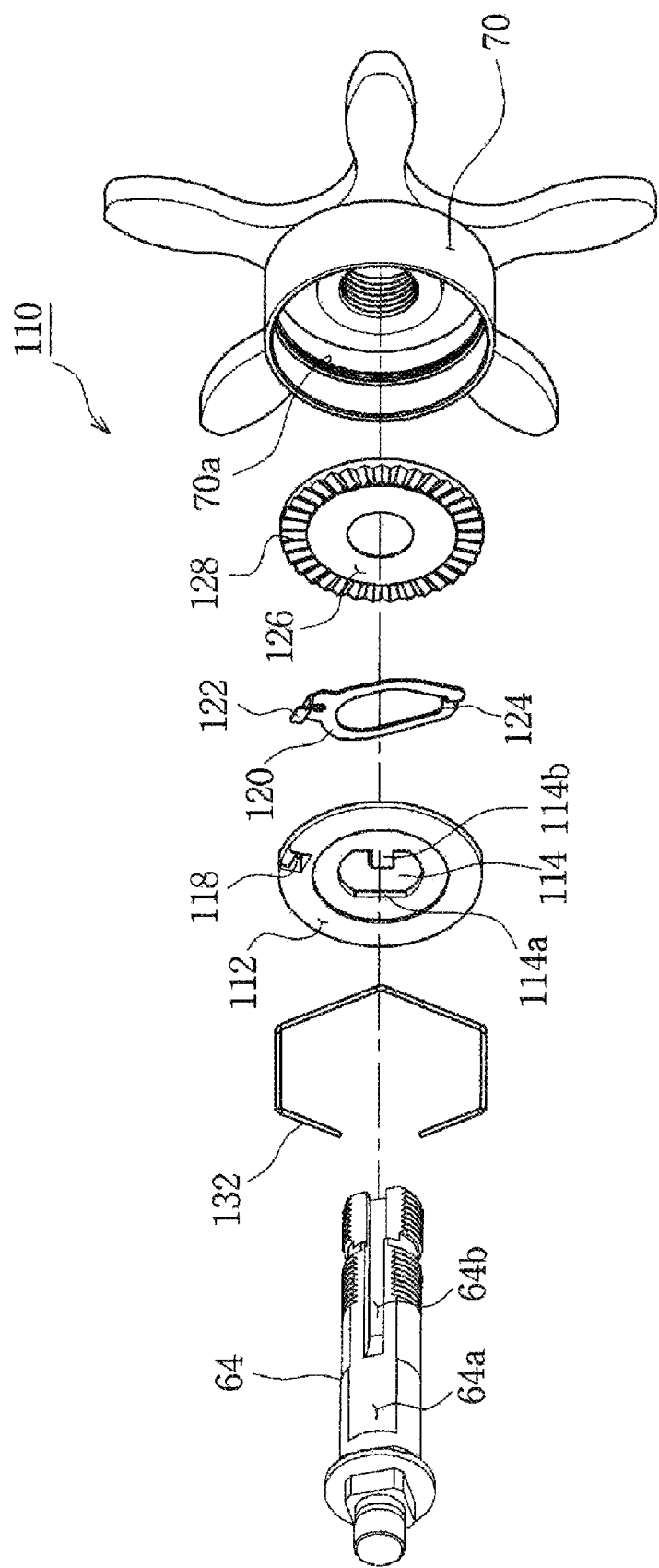
FIG. 4 is an exploded perspective view showing the construction of a click sound generating device installed in a drag knob of a bait reel, according to a second embodiment of the present invention.

Of the first through fifth embodiments shown in FIGS. 2 through 7, the first, third, fourth and fifth embodiments of FIGS. 2, 5, 6 and 7 are configured such that the click spring is interlocked with the drag knob 70 and the click plate is interlocked with the gear shaft 64. The second embodiment of FIG. 4 is configured such that the click spring is interlocked with the gear shaft 64 and the click plate is interlocked with the drag knob 70.

Furthermore, the first, fourth and fifth embodiments are configured such that a holder installed in the drag knob 70 functions as the means for holding the click spring.

Figure 5:
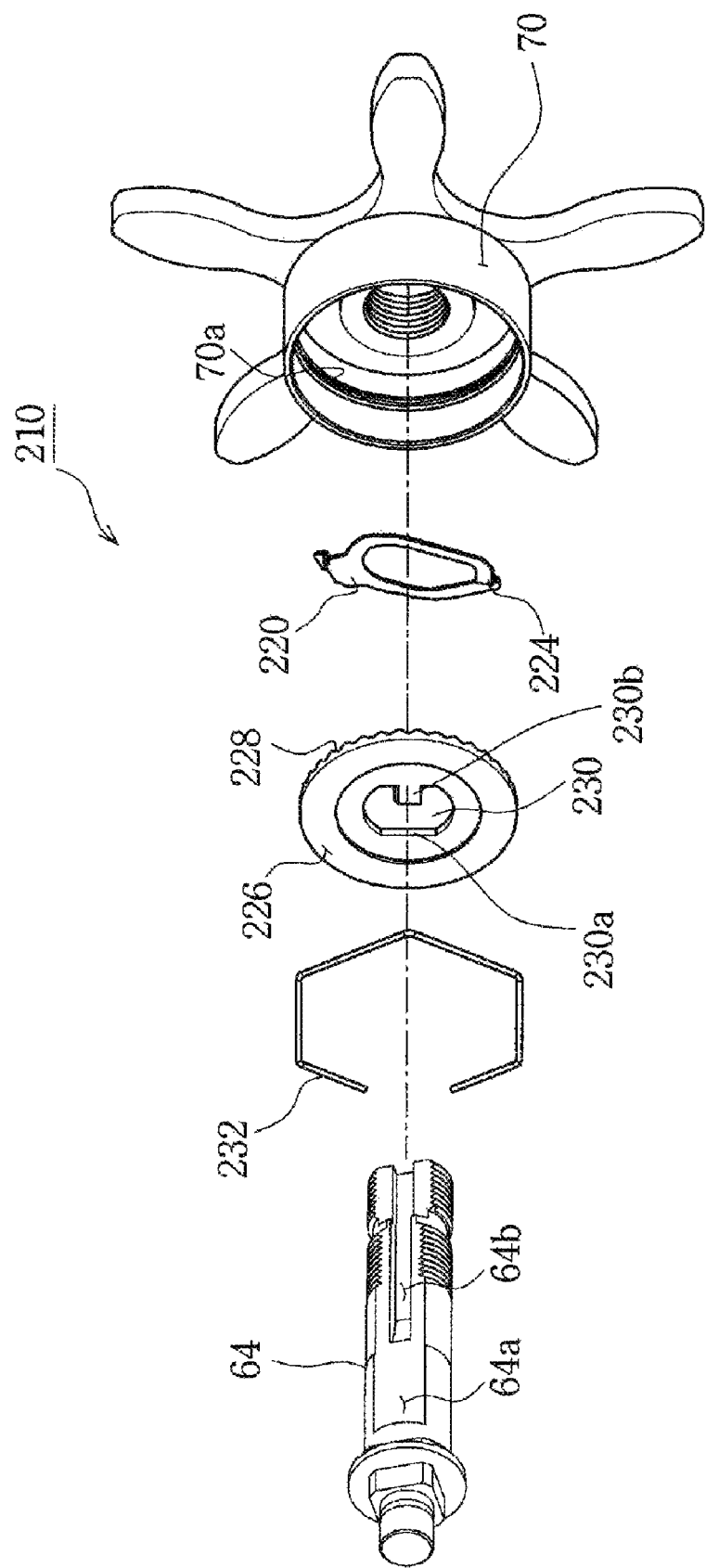
FIG. 5 is an exploded perspective view showing the construction of a click sound generating device installed in a drag knob of a bait reel, according to a third embodiment of the present invention.

In the third embodiment of FIG. 5, the click spring is directly mounted to the drag knob 70, so that a means for the click spring comprises a locking protrusion (not designated by a reference numeral in FIG. 5) of the click spring 220 and an insert hole (not shown) of the drag knob 70 corresponding to the locking protrusion.

Figure 6:
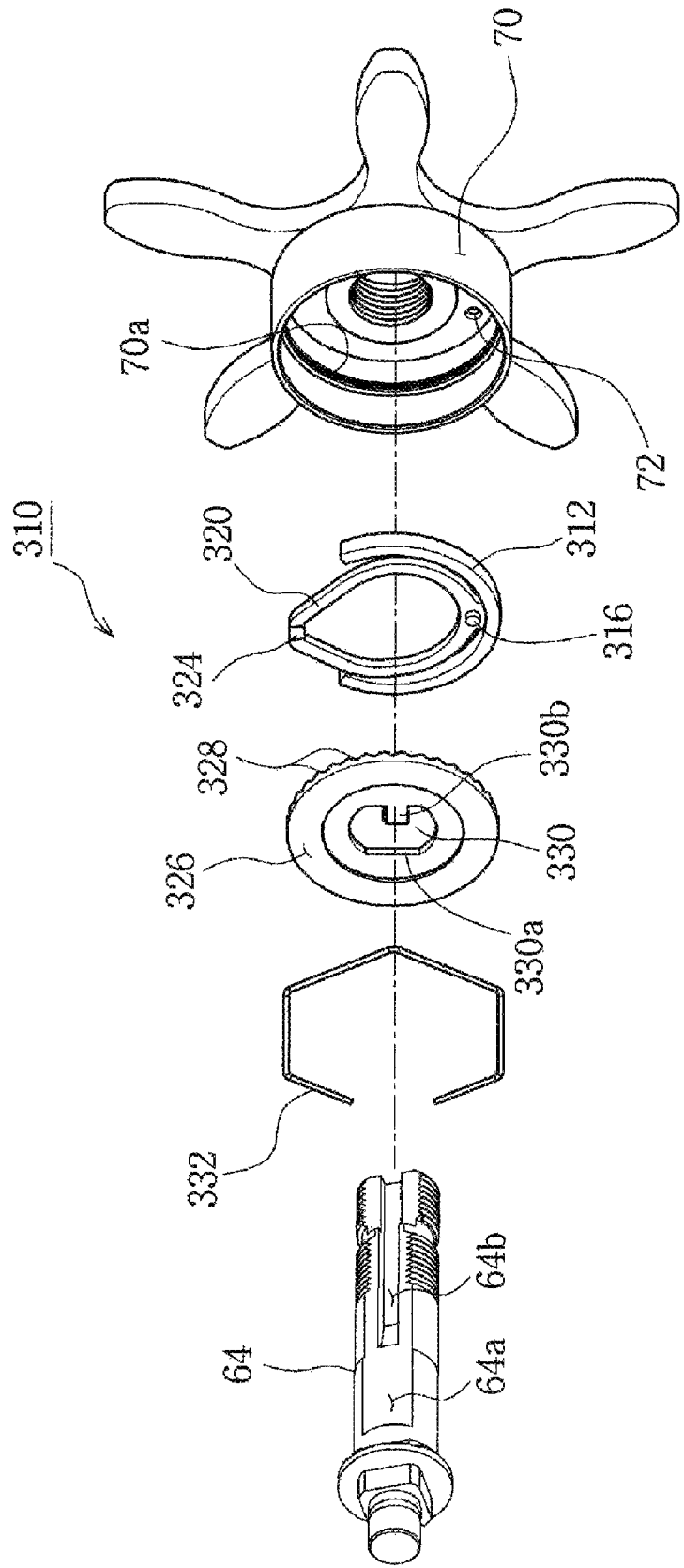
FIG. 6 is an exploded perspective view showing the construction of a click sound generating device installed in a drag knob of a bait reel, according to a fourth embodiment of the present invention.
Figure 7:
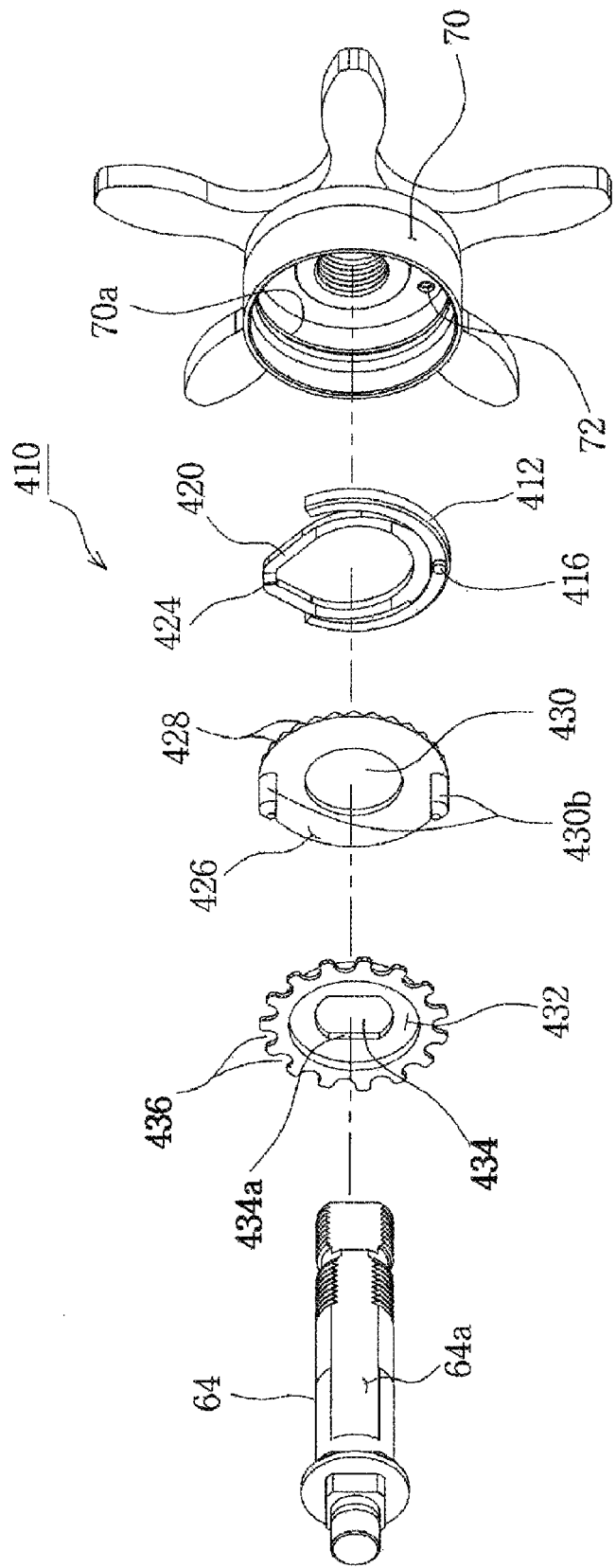
FIG. 7 is an exploded perspective view showing the construction of a click sound generating device installed in a drag knob of a bait reel, according to a fifth embodiment of the present invention.

In addition, the fourth and fifth embodiments of FIGS. 6 and 7 are configured such that the click spring is integrally formed with the spring holder. The remaining embodiments are configured such that the click spring is formed separately from the spring holder.

Figure 12:
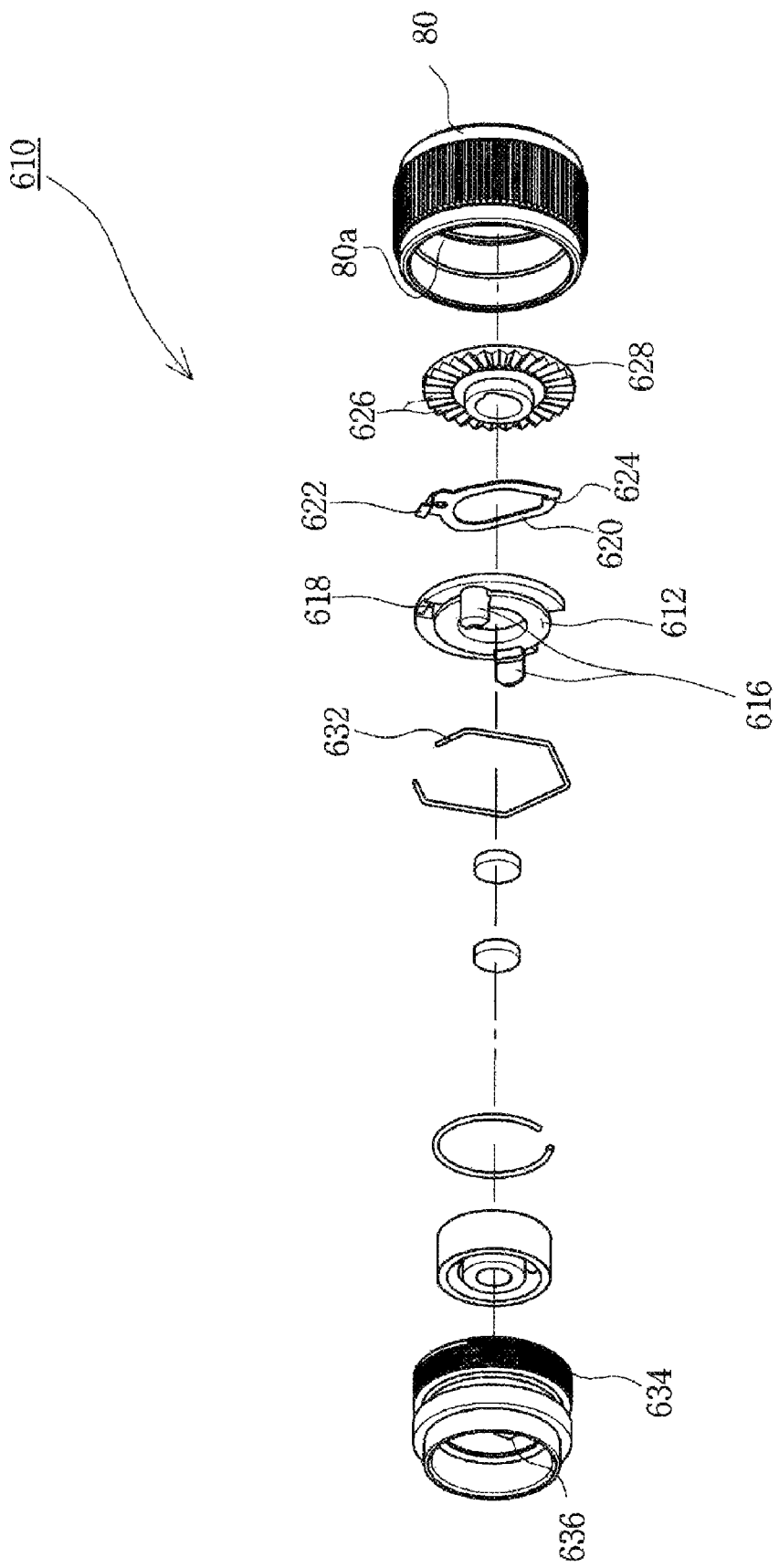
FIG. 12 is an exploded perspective view showing the construction of a click sound generating device installed in a tension knob of a bait reel, according to a seventh embodiment of the present invention.
Figure 13:
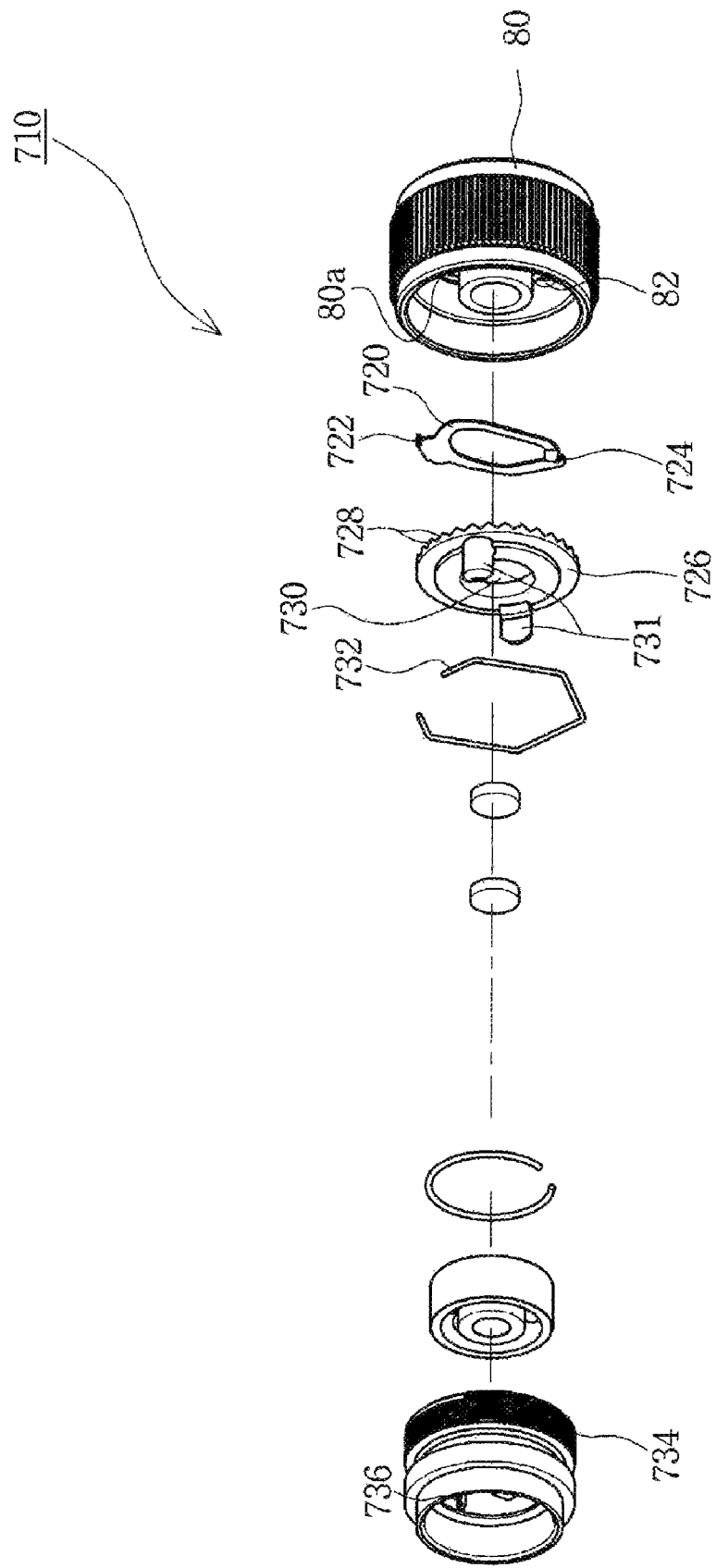
FIG. 13 is an exploded perspective view showing the construction of a click sound generating device installed in a tension knob of a bait reel, according to an eighth embodiment of the present invention.
Figure 14:
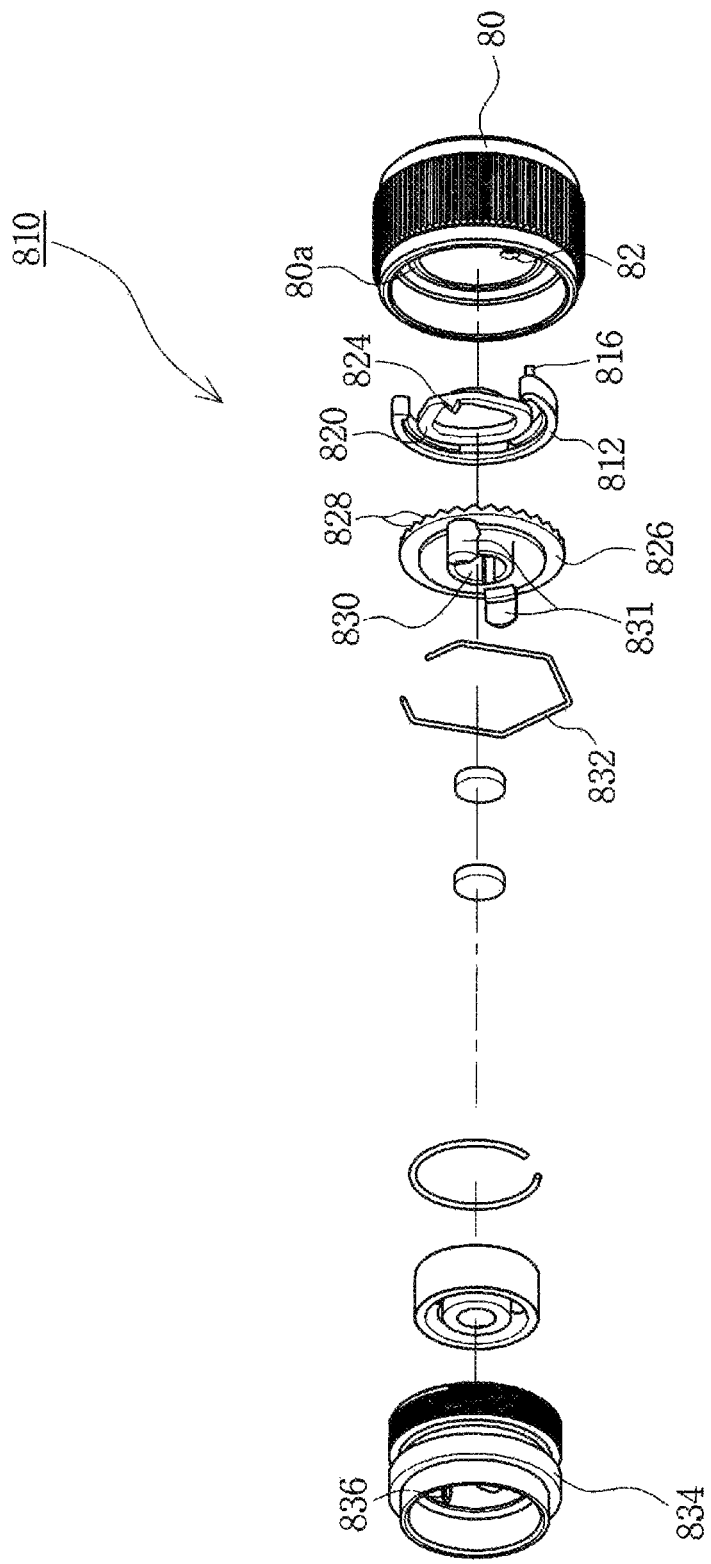
FIG. 14 is an exploded perspective view showing the construction of a click sound generating device installed in a tension knob of a bait reel, according to a ninth embodiment of the present invention.

Meanwhile, of the group of embodiments shown in FIGS. 8 through 14, only the ninth embodiment of FIG. 14 is configured such that the spring holder is integrated with the click spring.

SECOND EMBODIMENT

FIG. 4 is an exploded perspective view showing the construction of a click sound generating device 110 of a bait reel for fishing, according to the second embodiment of the present invention.

As mentioned above, the second embodiment of FIG. 4 is configured such that a click spring 120 is interlocked with a gear shaft 64 and a click plate 126 is interlocked with a drag knob 70.

In detail, unlike the first embodiment, in the click sound generating device 110 according to the second embodiment of FIG. 4, the click plate 126 is fastened to the star drag knob 70 and thus rotated by rotating the star drag knob 70 such that it comes into contact with the click spring 120 which is in the stationary state, thereby generating clicking sounds.

As shown in FIG. 4, the click sound generating device 110 according to the second embodiment includes the click plate 126, the click spring 120 and a spring holder 112. The click plate 126 has an uneven surface 128 formed on a first side thereof. The click spring 120 has an annular shape and includes a contact protrusion 124 which is in elastic contact with the uneven surface 128 of the click plate 126. The spring holder 112 has a locking hole 118 into which a locking protrusion 122 of the click spring 120 is fitted and functions as a means for holding the click spring 120. The click plate 126 is fastened to the inner surface of the star drag knob 70. The spring holder 112 for supporting the click spring 120 has a center hole 114 on a central portion thereof. The gear shaft 64 is fitted into the center hole 114 of the spring holder 112. A linear portion 114a is formed on a portion of the circumferential inner edge of the center hole 114. The linear portion 114a corresponds to a planar surface portion 64a formed on the gear shaft 64 so that the spring holder 112 can be fastened to the gear shaft 64.

A stop protrusion 114b is provided on the circumferential inner edge of the center hole 114 of the spring holder 112. A longitudinal slot 64b is formed in a portion of the outer surface of the gear shaft 64. Thus, when the gear shaft 64 is fitted into the center hole 114 of the spring holder 112, the stop protrusion 114b is inserted into and locked to the longitudinal slot 64b. Thereby, the spring holder 112 can be more stably fastened to the gear shaft 64, and even though the star drag knob 70 rotates, the spring holder 112 can be more reliably prevented from rotating along with the star drag knob 70. As such, the planar surface portion 64a and the longitudinal slot 64b of the gear shaft 64, and the linear portion 114a and the stop protrusion 114b of the spring holder 112 that correspond to the portion 64a and the slot 64b are used as a means for holding the spring holder 112 on the gear shaft 64.

The click sound generating device 110 according to the second embodiment also includes a removal prevention ring 132 which functions as a means for preventing the click spring 120, the spring holder 112 and the click plate 126 from separating from the star drag knob 70. The removal prevention ring 132 is locked to a locking groove 70a which is formed in the circumferential inner surface of the star drag knob 70 and thus holds the spring holder 112, the click spring 120 and the click plate 126 such that they can be prevented from being undesirably removed from the star drag knob 70.

In the click sound generating device 110 according to the second embodiment having the above-mentioned construction, when the user rotates the drag knob 70, the click plate 126 fastened to the drag knob 70 rotates along with the drag knob 70. At this time, the uneven surface 128 formed on the first side of the click plate 126 moves over the contact protrusion 124 of the click spring 120, so that the snapping of the contact protrusion 124 by the elastic force of the click spring 120 makes clicking sounds.

THIRD EMBODIMENT

FIG. 5 is an exploded perspective view showing the construction of a click sound generating device 210 of a bait reel for fishing, according to the third embodiment of the present invention.

The click sound generating device 210 according to the third embodiment of FIG. 5 is configured such that a click spring 220 is directly fastened to a drag knob 70 without using a separate spring holder unlike the construction of the first embodiment, so that when the drag knob 70 rotates, the click spring 220 rotates along with the drag knob 70 and comes into elastic contact with a click plate 226 which is in the stationary state, thus generating clicking sounds.

In detail, as shown in FIG. 5, the click sound generating device 210 according to the third embodiment includes the click spring 220 which includes a contact protrusion 224 formed on one end thereof, and the click plate 226 which has an uneven surface 228 so that the contact protrusion 224 of the click spring 220 comes into elastic contact with the uneven surface 228. The click spring 220 is directly fastened to the drag knob 70 without using a separate spring holder. The click plate 226 has a center hole 230 into which a gear shaft 64 is fitted. A linear portion 230a is formed on a portion of the circumferential inner edge of the center hole 230. The linear portion 230a corresponds to a planar surface portion 64a formed on the gear shaft 64 so that the click plate 226 can be fastened to the gear shaft 64.

In the third embodiment of FIG. 5, because the click spring 220 is directly mounted to the drag knob 70, a means for holding the click spring 220 comprises a locking protrusion (not designated by a reference numeral) of the click spring 220 and an insert hole (not shown) of the drag knob 70 corresponding to the locking protrusion.

A stop protrusion 230b is provided on the circumferential inner edge of the center hole 230 of the click plate 226. A longitudinal slot 64b is formed in a portion of the outer surface of the gear shaft 64. Thus, when the gear shaft 64 is fitted into the center hole 230 of the click plate 226, the stop protrusion 230b is inserted into and locked to the longitudinal slot 64b. Thereby, the click plate 226 can be more stably fastened to the gear shaft 64, and even though the star drag knob 70 is rotating, the click plate 226 can be more reliably prevented from rotating along with the star drag knob 70.

As such, the planar surface portion 64a and the longitudinal slot 64b of the gear shaft 64, and the linear portion 230a and the stop protrusion 230b of the spring holder 226 that correspond to the portion 64a and the slot 64b are used as a means for holding the click plate 226 on the gear shaft 64.

The click sound generating device 210 according to the third embodiment also includes a removal prevention ring 232 which functions as a removal prevention means. In detail, the removal prevention ring 232 is locked to a locking groove 70a which is formed in the circumferential inner surface of the star drag knob 70 and thus holds the click plate 226 and the click spring 220 such that they can be prevented from being undesirably removed from the star drag knob 70.

In the click sound generating device 210 according to the third embodiment having the above-mentioned construction, when the user rotates the drag knob 70, the click spring 220 fastened to the drag knob 70 is rotated along with the drag knob 70. At this time, the contact protrusion 224 formed on the click spring 220 elastically moves along the uneven surface 228 of the click plate 226 which is firmly fitted over the gear shaft 64. Thereby, clicking sounds are generated.

FOURTH EMBODIMENT

FIG. 6 is an exploded perspective view showing the construction of a click sound generating device 310 of a bait reel for fishing, according to the fourth embodiment of the present invention.

The click sound generating device 310 according to the third embodiment of FIG. 6 includes a spring holder 312, a click spring 320 and a click plate 326 in a manner similar to that of the first embodiment but is configured such that the spring holder 312 is integrated with the click spring 320 unlike in the first embodiment. In particular, the spring holder 312 which functions as a means for holding the click spring 320 is integrally formed with the click spring 320 to form a shape in which the spring holder 312 surrounds the click spring 320.

As shown in FIG. 6, the click sound generating device 310 according to the third embodiment includes the spring holder 312, the click spring 320 having an annular shape, and the click plate 326.

The spring holder 312 has a semicircular shape. A stopper 316 protrudes from a first side of the spring holder 312 towards the drag knob 70. A separate insert hole 72 is formed in the inner surface of the drag knob 70, and the stopper 316 is inserted into the insert hole 72 so that the spring holder 312 is rotated by the rotation of the drag knob 70.

The click spring 320 is provided on the circumferential inner surface of the spring holder 312. In this embodiment the click spring 320 is formed along with the spring holder 312 during the process of forming the latter such that the click spring 320 is integrally formed on the circumferential inner surface of the spring holder 312. A contact protrusion 324 is integrally formed on a second side of the click spring 320. The contact protrusion 324 is maintained in a state of being in elastic contact with an uneven surface 328 which is formed on a first side of the click plate 326. When the click spring 320 is rotated by the rotation of the spring holder 312, the contact protrusion 324 elastically moves along and snaps on the uneven surface 328, thereby generating clicking sounds.

The click plate 326 is fitted over the gear shaft 64 and the first side thereof is in elastic contact with the contact protrusion 324 of the click spring 320. A center hole 330 is formed through a central portion of the click plate 326 so that the gear shaft 64 is fitted into the center hole 330. A linear portion 330*a* is formed on a portion of the circumferential inner edge of the center hole 330. The linear portion 330*a* corresponds to a planar surface portion 64*a* formed on the circumferential outer surface of the gear shaft 64, so that when the drag knob 70 rotates, the click plate 326 is maintained in the state of having been fastened to the gear shaft 64 rather than rotating along with the drag knob 70.

A stop protrusion 330*b* is provided on the circumferential inner edge of the center hole 330 of the click plate 326. A longitudinal slot 64*b* is formed in a portion of the outer surface of the gear shaft 64. Thus, when the gear shaft 64 is fitted into the center hole 330 of the click plate 326, the stop protrusion 330*b* is inserted into and locked to the longitudinal slot 364*b*. Thereby, even though the star drag knob 70 rotates, the click plate 326 can be more reliably maintained in the state of having been fastened to the gear shaft 364 rather than rotating along with the star drag knob 70. The planar surface portion 64*a* and the longitudinal slot 64*b* of the gear shaft 64, and the linear portion 330*a* and the stop protrusion 330*b* of the click plate 326 that correspond to the portion 64*a* and the slot 64*b* are used as a means for holding the click plate 326 on the gear shaft 64.

The uneven surface 328 having a crown gear shape is formed on the perimeter of the first side of the click plate 326 so that the contact protrusion 324 of the click spring 320 comes into elastic contact with the uneven surface 328 and elastically moves along the uneven surface 328 to generate clicking sounds. In other words, when the contact protrusion 324 rotates along the uneven surface 328, the contact protrusion 324 repetitively strikes the uneven surface 328 by the elastic force of the click spring 320, thus generating clicking sounds.

The click sound generating device 310 according to the fourth embodiment also includes a removal prevention ring 332 which functions as a removal prevention means. In detail, the removal prevention ring 332 is locked to a locking groove 70*a* which is formed in the circumferential inner surface of the star drag knob 70 and thus holds the spring holder 312, the click spring 320 and the click plate 326 such that they can be prevented from undesirably separating from the star drag knob 70.

In the click sound generating device 310 according to the fourth embodiment having the above-mentioned construction, when the user rotates the drag knob 70, the spring holder 312 fastened to the drag knob 70 and the click spring 320 integrated with the inner surface of the spring holder 312 are rotated along with the drag knob 70. At this time, the contact protrusion 324 formed on the click spring 320 elastically moves along the uneven surface 328 of the click plate 326 which is firmly fitted over the gear shaft 64. Thereby, clicking sounds are generated.

FIFTH EMBODIMENT

FIG. 7 is an exploded perspective view showing the construction of a click sound generating device 410 of a bait reel for fishing, according to the fifth embodiment of the present invention.

The click sound generating device 410 according to the fifth embodiment of FIG. 7 is configured such that a spring holder 412 is integrated with a click spring 420, in the same manner as that of the fourth embodiment.

Unlike the embodiments of FIG. 2, 4 or 6, the click sound generating device 410 of the fifth embodiment is characterized in that a locking washer 432 for holding a click plate 426 is further fitted over a circumferential outer surface of a gear shaft 64. The locking washer 432 and stop protrusions 430*b* of the click plate 426 function as a means for holding the click plate 426 on the gear shaft 64.

As shown in FIG. 7, the click sound generating device 410 according to the fifth embodiment includes the click spring 420, the spring holder 412 for holding the click spring 420, the click plate 426 and the locking washer 432 for holding the click plate 426.

The spring holder 412 has a semicircular shape. A stopper 416 is provided on a first side of the spring holder 312. In particular, the stopper 416 protrudes from the spring holder 312 towards the drag knob 70. A separate insert hole 72 is formed in the inner surface of the drag knob 70, and the stopper 416 is fitted into the insert hole 72 so that the spring holder 412 rotates when the drag knob 70 is rotated.

The click spring 420 having an annular shape is provided on the circumferential inner surface of the spring holder 412. In this embodiment, the click spring 420 is formed along with the spring holder 412 during the process of forming the latter such that the click spring 420 is integrally formed on the circumferential inner surface of the spring holder 412. A contact protrusion 424 is integrally formed on a second side of the click spring 420. The contact protrusion 424 is maintained in a state of being in elastic contact with an uneven surface 428 which is formed on a first side of the click plate 426. Thus, when the click spring 420 is rotated by the rotation of the spring holder 412, the contact protrusion 424 elastically moves along and snaps on the uneven surface 428, thereby generating clicking sounds.

The click plate 426 is fitted over the gear shaft 64 and the first side thereof is in elastic contact with the contact protrusion 424 of the click spring 420. A center hole 430 is formed through a central portion of the click plate 426 so that the gear shaft 64 is fitted into the center hole 430.

The uneven surface 428 is formed on the perimeter of the first side of the click plate 426 so that the contact protrusion 424 of the click spring 420 comes into elastic contact with the uneven surface 428 and elastically moves along the uneven surface 428 to generate clicking sounds. In other words, when the contact protrusion 424 rotates along the uneven surface 428, the contact protrusion 424 repetitively strikes the uneven surface 428 by the elastic force of the click spring 420, thus generating clicking sounds.

Furthermore, the stop protrusions 430*b* are respectively provided on a second side of the click plate 426 at opposite positions spaced apart by 180°. The stop protrusions 430*b* are respectively inserted into a corresponding two of locking notches 436 which are formed in the peripheral edge of the locking washer 432. Thereby, the click plate 426 is fastened to the locking washer 432.

The locking washer 432 is fitted over the gear shaft 64 and functions as a means for fastening the click plate 426 to the gear shaft 64. A center hole 434 is formed through a central portion of the locking washer 432 so that the gear shaft 64 is fitted into the center hole 434. A linear portion 434*a* is formed on a portion of the circumferential inner edge of the center hole 434. The linear portion 434*a* corresponds to a planar surface portion 64*a* formed on the circumferential outer surface of the gear shaft 64, so that the locking washer 432 can be reliably maintained in the state of having been fastened to the gear shaft 64.

The locking notches 436 are formed in the peripheral edge of the locking washer 432 at positions spaced apart from each other at regular intervals. The stop protrusions 430*b* of the click plate 426 are inserted into a corresponding two of the locking notches 436 so that the click plate 426 is locked to the locking washer 432. Thus, when the drag knob 70 rotates, the click plate 426 can be maintained in the state of having been fastened to the gear shaft 64 by the locking washer 432 rather than rotating along with the drag knob 70.

In the click sound generating device 410 according to the fifth embodiment having the above-mentioned construction, when the user rotates the drag knob 70, the spring holder 412 fastened to the drag knob 70 and the click spring 420 integrated with the inner surface of the spring holder 412 are rotated along with the drag knob 70. At this time, the contact protrusion 424 formed on the click spring 420 elastically moves along the uneven surface 428 of the click plate 426 which is firmly fitted over the gear shaft 64. Thereby, clicking sounds are generated.

SIXTH EMBODIMENT

Figure 8:
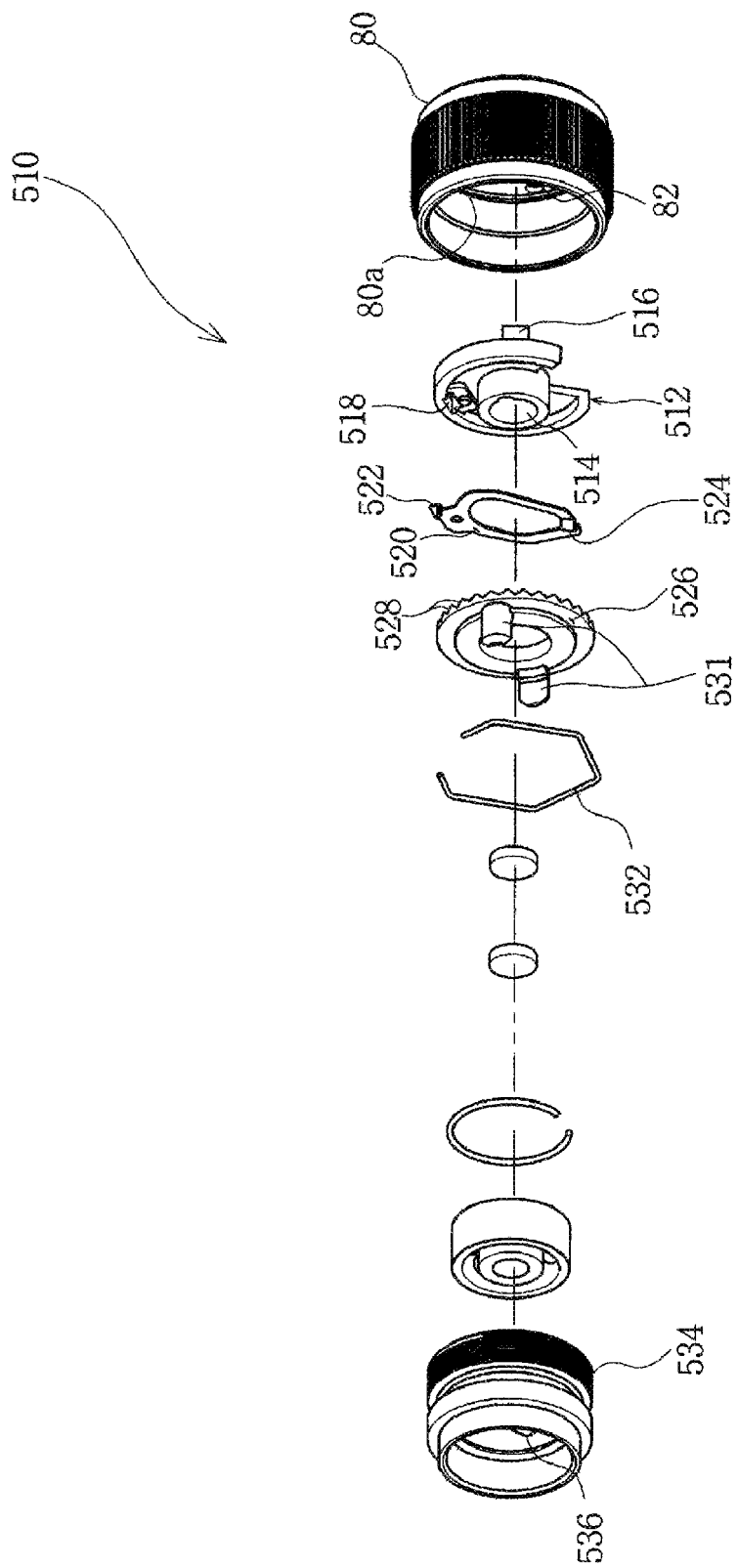
FIG. 8 is an exploded perspective view showing the construction of a click sound generating device installed in a tension knob of a bait reel, according to a sixth embodiment of the present invention.
Figure 9:
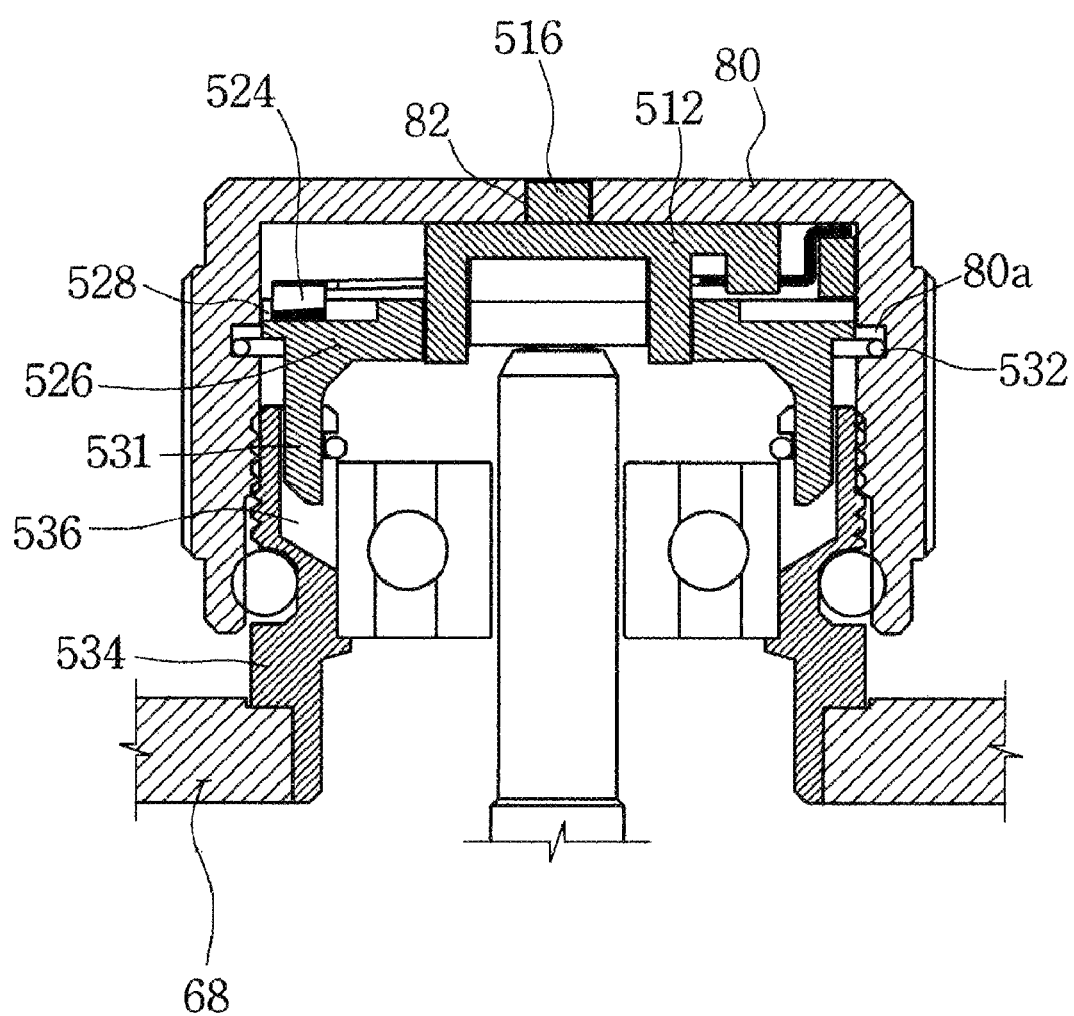
FIG. 9 is a sectional view of FIG. 8.

FIG. 8 is an exploded perspective view showing the construction of a click sound generating device 510 of a bait reel for fishing, according to the sixth embodiment of the present invention. FIG. 9 is a sectional view of FIG. 8.

The click sound generating device 510 according to the sixth embodiment of FIGS. 8 and 9 is configured such that a spring holder 512 and a click spring 520 are fastened to a tension knob 80 so that the spring holder 512 and the click spring 520 are rotated by rotating the tension knob 80 and the click spring 520 is thereby brought into contact with the click plate 526 which is in a stationary state, thus generating clicking sounds.

Unlike the embodiments of FIGS. 2 through 7, the sixth through ninth embodiments of FIGS. 8 through 14 are configured such that the click sound generating device is provided in the tension knob 80.

As shown in FIGS. 8 and 9, the click sound generating device 510 according to the sixth embodiment includes the click spring 520, the spring holder 512 which functions as a means for holding the click spring 520, the click plate 526 and a removal prevention ring 532 which functions as a removal prevention means.

The spring holder 512 which functions as a means for holding the click spring 520 is fastened to the inner surface of the tension knob 80. A center hole 514 is formed through a central portion of the spring holder 512 so that a spool shaft 63 is inserted through the center hole 514. A stopper 516 protrudes from a first side of the spring holder 512. The stopper 516 is inserted into an insert hole 82 formed in the inner surface of the tension knob 80. Thus, the spring holder 512 is rotated by rotating the tension knob 80. In addition, a locking hole 518 is formed in a second side of the spring holder 512. A locking protrusion 522 of the click spring 520 is fitted into the locking hole 518, and the click spring 520 is thereby fastened to the spring holder 512.

The click spring 520 which is fastened to the spring holder 512 rotates in one direction depending on the rotation of the tension knob 80 and thus generates clicking sounds. The click spring 520 has an annular shape. The locking protrusion 522 having a stepped shape is provided on a first side of the click spring 520. The click spring 520 is fastened to the spring holder 512 by fitting the locking protrusion 522 into the locking hole 518 of the spring holder 512. Furthermore, a contact protrusion 524 is provided on a second side of the click spring 520. The contact protrusion 524 is maintained in a state of being in elastic contact with an uneven surface 528 which is formed on a perimeter of a first side of the click plate 526. When the click spring 520 is rotated by the rotation of the spring holder 512, the contact protrusion 524 elastically moves along and snaps on the uneven surface 528, thereby generating clicking sounds.

Figure 10:
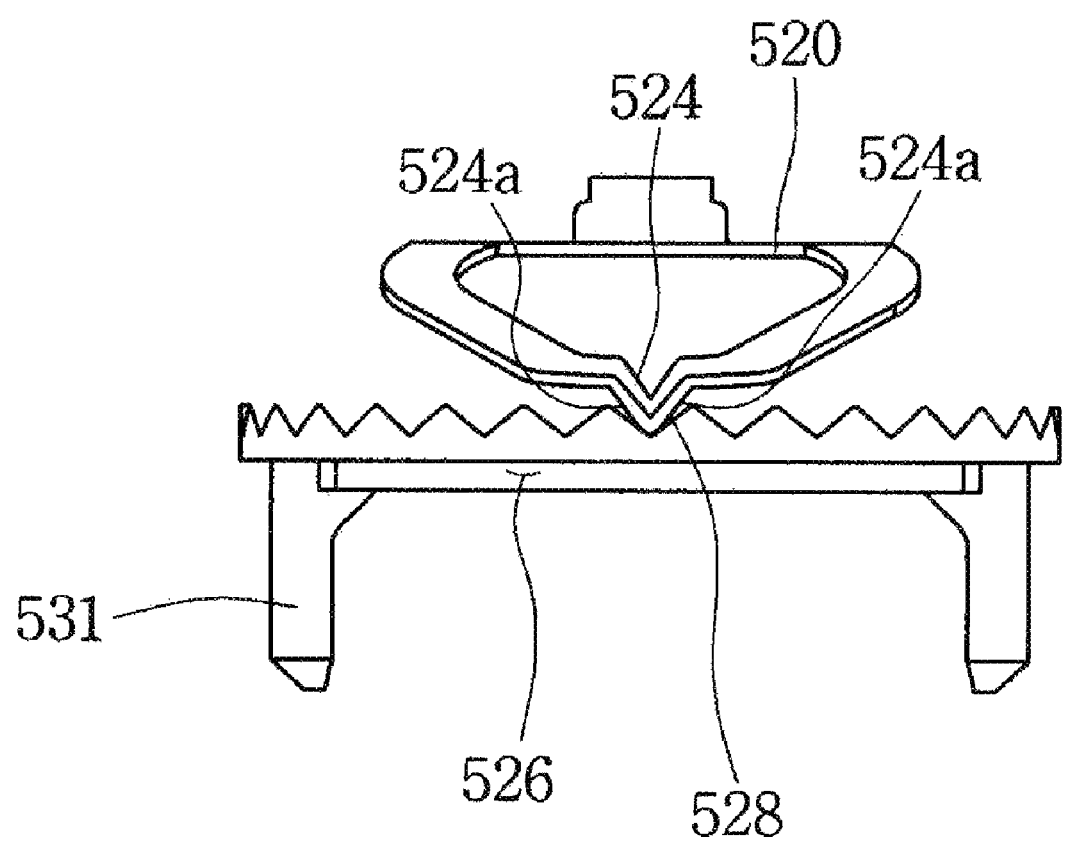
FIG. 10 is a view showing a contact protrusion of a click spring being in contact with an uneven surface of a click plate of FIG. 8.
Figure 11:
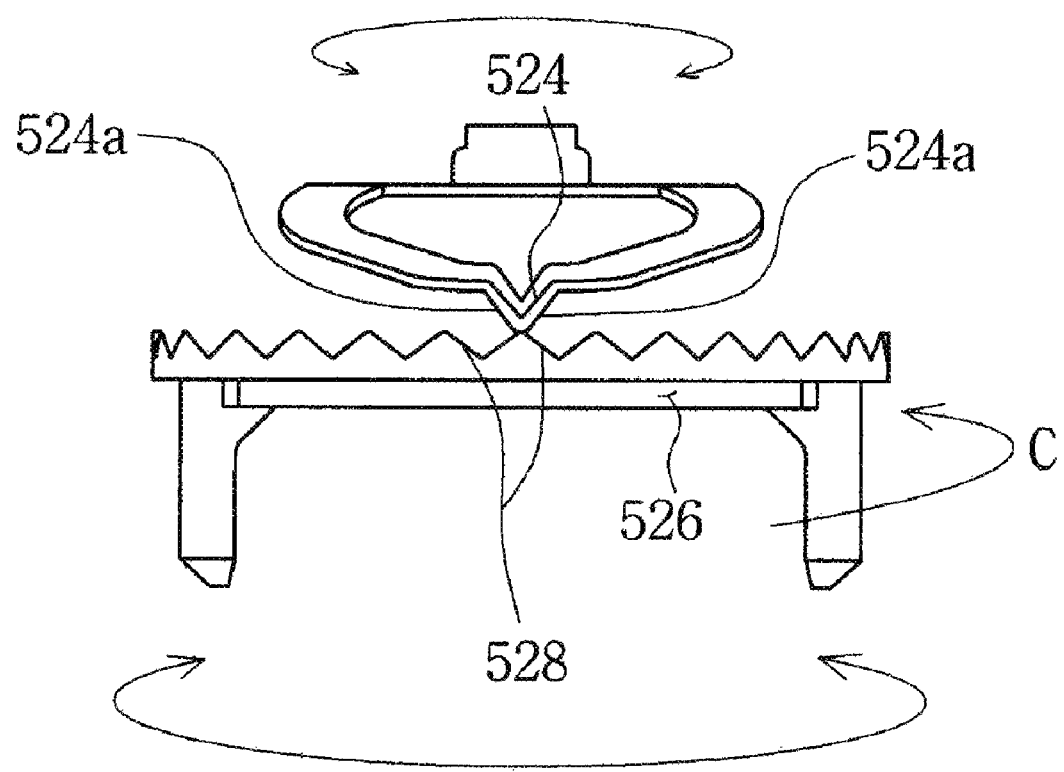
FIG. 11 is a view showing the operation of the contact protrusion of FIG. 10.

Meanwhile, as shown in FIG. 10, the contact protrusion 524 of the click spring 520 has inclined surfaces 524a formed on opposite sides thereof, such that the width of the contact protrusion 524 is reduced from the proximal end thereof to the distal end thereof. Due to this structure of the contact protrusion 524, as shown in FIG. 11, when the contact protrusion 524 moves along the uneven surface 528 to generate clicking sounds, the contact protrusion 524 can smoothly move over projections constituting the uneven surface 528 regardless of the direction in which the click spring 520 rotates. This is more convenient for the user.

The click plate 526 is fitted over the spool shaft 63, and the first side of the click plate 526 is in elastic contact with the contact protrusion 524 of the click spring 520. A center hole (not designated by a reference numeral) into which the spool shaft 63 is fitted is formed through the central portion of the click plate 526. Furthermore, the uneven surface 528 is formed on the perimeter of the first side of the click plate 526 so that the contact protrusion 524 of the click spring 520 comes into elastic contact with the uneven surface 528 and elastically moves along the uneven surface 528 to generate clicking sounds. In other words, when the contact protrusion 524 rotates along the uneven surface 528, the contact protrusion 524 repetitively strikes the uneven surface 528 under the elastic force of the click spring 520, thus generating clicking sounds.

In addition, stop protrusions 531 are respectively provided on a second side of the click plate 526 at opposite positions spaced apart at 180°. The stop protrusions 531 are inserted into respective stop holes 536 of a retaining member 534 which is fastened to a side cover 68 of the bait reel. Thereby, the click plate 526 is fastened to the retaining member 534. Thus, when the tension knob 80 rotates, the click plate 526 can be maintained in the state of having been fastened to the retaining member 534 rather than rotating along with the tension knob 80.

As such, the stop protrusions 531 and the retaining member 534 are used as a means for holding the click plate 526. Thereby, the click plate 526 can be maintained in the stationary state regardless of the rotation of the tension knob 80.

The removal prevention ring 532 which functions as the removal prevention means is locked to a locking groove 80a which is formed in the circumferential inner surface of the tension knob 80. The removal prevention ring 532 holds the spring holder 512, the click spring 520 and the click plate 526 to prevent them from undesirably separating from the tension knob 80.

The retaining member 534 is fastened to the side cover 68 which is assembled to the sidewall of the reel frame 60 of the bait reel. The stop holes 536 are formed in the circumferential inner surface of the retaining member 534 so that the stop protrusions 531 of the click plate 526 are inserted into the respective stop holes 536. Thereby, the retaining member 534 holds the click plate 526 such that the click plate 526 is prevented from rotating when the tension knob 80 rotates.

In the click sound generating device 510 according to the sixth embodiment having the above-mentioned construction, when the user rotates the tension knob 80, the spring holder 512 fastened to the tension knob 80 and the click spring 520 integrated with the inner surface of the spring holder 512 rotate along with the rotation of the tension knob 80. At this time, the contact protrusion 524 formed on the click spring 520 elastically moves along the uneven surface 528 of the click plate 526 fastened to the retaining member 534. Thereby, clicking sounds are generated.

SEVENTH EMBODIMENT

FIG. 12 is an exploded perspective view showing the construction of a click sound generating device 610 of a bait reel for fishing, according to the seventh embodiment of the present invention.

Unlike the sixth embodiment, in the click sound generating device 610 according to the seventh embodiment of FIG. 12, a click plate 626 is fastened to a tension knob 80 and thus rotated by rotating the tension knob 80 such that the click plate 626 comes into contact with a click spring 620 which is in the stationary state, thereby generating clicking sounds.

As shown in FIG. 12, the click sound generating device 610 according to the seventh embodiment includes the click plate 626, the click spring 620 and a spring holder 612. The click plate 626 has an uneven surface 628 formed on a first side thereof. The click spring 620 has an annular shape and includes a contact protrusion 624 which is in elastic contact with the uneven surface 628 of the click plate 626. The spring holder 612 has a locking hole 618 into which a locking protrusion 622 of the click spring 620 is fitted. The click plate 626 is fastened to the inner surface of the tension knob 80. The spring holder 612 supports the click spring 620 and has on a central portion a center hole (not designated by a reference numeral) into which the spool shaft 63 is fitted.

Furthermore, stop protrusions 616 are provided on a second side of the spring holder 612 at opposite positions spaced apart at 180°. The stop protrusions 616 are inserted into respective stop holes 636 of a retaining member 634 which is fastened to a side cover 68 of the bait reel. Thereby, the spring holder 612 is fastened to the retaining member 634. Thus, when the tension knob 80 rotates, the spring holder 612 can be maintained in the state of having been fastened to the retaining member 634 rather than rotating along with the tension knob 80.

The click sound generating device 610 according to the seventh embodiment also includes a removal prevention ring 632. The removal prevention ring 632 is locked to a locking groove 80a which is formed in the circumferential inner surface of the tension knob 80 and thus holds the spring holder 612, the click spring 620 and the click plate 626 such that they can be prevented from undesirably separating from the tension knob 80.

The retaining member 634 is fastened to the side cover 68 which is assembled to the sidewall of the reel frame 60 of the bait reel. The stop holes 636 are formed in the circumferential inner surface of the retaining member 634 so that the stop protrusions 616 of the spring holder 612 are inserted into the respective stop holes 636. Thereby, the retaining member 634 holds the spring holder 612 such that the spring holder 612 is prevented from rotating when the tension knob 80 rotates. As such, the stop protrusions 616 and the retaining member 634 function as a means for holding the spring holder 612.

In the click sound generating device 610 according to the seventh embodiment having the above-mentioned construction, when the user rotates the tension knob 80, the click plate 626 fastened to the tension knob 80 is rotated along with the tension knob 80. At this time, the uneven surface 628 formed on the first side of the click plate 626 moves over the contact protrusion 624 of the click spring 620, so that the snapping of the contact protrusion 624 by the elastic force of the click spring 620 makes clicking sounds.

EIGHTH EMBODIMENT

FIG. 13 is an exploded perspective view showing the construction of a click sound generating device 710 of a bait reel for fishing, according to the eighth embodiment of the present invention.

The click sound generating device 710 according to the eighth embodiment of FIG. 13 is configured such that a click spring 720 is directly fastened to a tension knob 80 without using a separate spring holder unlike the construction of the sixth embodiment, so that when the tension knob 80 rotates, the click spring 720 rotates along with the tension knob 80 and comes into elastic contact with a click plate 726 which is in the stationary state, thus generating clicking sounds.

As shown in FIG. 13, the click sound generating device 710 according to the eighth embodiment includes the click spring 720 which includes a contact protrusion 724 formed on one end thereof, and the click plate 726 which has an uneven surface 728 so that the contact protrusion 724 of the click spring 720 comes into elastic contact with the uneven surface 728. The click spring 720 is directly fastened to the tension knob 80 without using a separate spring holder. The click plate 726 has on a central portion thereof a center hole 730 into which a spool shaft 63 is fitted.

Furthermore, stop protrusions 731 are respectively provided on a second side of the click plate 726 at opposite positions spaced apart by 180°. The stop protrusions 731 are inserted into respective stop holes 736 of a retaining member 734 which is fastened to a side cover 68 of the bait reel. Thereby, the click plate 726 is fastened to the retaining member 734. Thus, when the tension knob 80 rotates, the click plate 726 can be maintained in the state of having been fastened to the retaining member 734 rather than rotating along with the tension knob 80.

The click sound generating device 710 according to the eighth embodiment further includes a removal prevention ring 732 and the retaining member 734.

The removal prevention ring 732 is locked to a locking groove 80a which is formed in the circumferential inner surface of the tension knob 80. The removal prevention ring 732 holds the click spring 720 and the click plate 726 to prevent them from undesirably separating from the tension knob 80.

The retaining member 734 is fastened to the side cover 68 which is assembled to the sidewall of the reel frame 60 of the bait reel. The stop holes 736 are formed in the circumferential inner surface of the retaining member 734 so that the stop protrusions 731 of the click plate 726 are inserted into the respective stop holes 736. Thereby, the retaining member 734 holds the click plate 726 such that the click plate 726 is prevented from rotating when the tension knob 80 rotates.

In the click sound generating device 710 according to the eighth embodiment having the above-mentioned construction, when the user rotates the tension knob 80, the click spring 720 fastened to the tension knob 80 is rotated along with the tension knob 80. At this time, the contact protrusion 724 formed on the click spring 720 elastically moves along the uneven surface 728 of the click plate 726 fastened to the retaining member 734. Thereby, clicking sounds are generated.

NINTH EMBODIMENT

FIG. 14 is an exploded perspective view showing the construction of a click sound generating device 810 of a bait reel for fishing, according to the ninth embodiment of the present invention.

The click sound generating device 810 according to the ninth embodiment of FIG. 14 includes a spring holder 812, a click spring 820 and a click plate 826 in a manner similar to that of the sixth embodiment but is configured such that the spring holder 812 is integrated with the click spring 820 unlike in the sixth embodiment. It is preferable that the spring holder 812 be integrally formed with the click spring 820 in a shape in which the spring holder 812 surrounds the click spring 820.

In detail, as shown in FIG. 14, click sound generating device 810 according to the ninth embodiment includes the spring holder 812, the click spring 820, the click plate 826, a removable prevention ring 832 and a retaining member 834.

The spring holder 812 has a semicircular shape. A stopper 816 protrudes from a first side of the spring holder 812 in the direction of the tension knob 80. A separate insert hole 82 is formed in the inner surface of the tension knob 80, and the stopper 816 is inserted into the insert hole 82 so that the spring holder 812 is rotated by the rotation of the tension knob 80.

The click spring 820 is provided on the circumferential inner surface of the spring holder 812. In this embodiment the click spring 820 is formed along with the spring holder 812 during the process of forming the spring holder 812 such that the click spring 820 is integrally formed on the circumferential inner surface of the spring holder 812. A contact protrusion 824 is integrally formed on a second side of the click spring 820. The contact protrusion 824 is maintained in a state of being in elastic contact with an uneven surface 828 which is formed on a first side of the click plate 826. When the click spring 820 is rotated by the rotation of the spring holder 812, the contact protrusion 824 elastically moves along and snaps on the uneven surface 828, thereby generating clicking sounds.

The click plate 826 is fitted over the spool shaft 63 and the first side thereof is in elastic contact with the contact protrusion 824 of the click spring 820. A center hole 830 is formed through a central portion of the click plate 826 so that the spool shaft 63 is fitted into the center hole 330.

Furthermore, stop protrusions 831 are respectively provided on a second side of the click plate 826 at opposite positions spaced apart by 180°. The stop protrusions 831 are inserted into respective stop holes 836 of a retaining member 834 which is fastened to a side cover 68 of the bait reel. Thereby, the click plate 826 is fastened to the retaining member 834. Thus, when the tension knob 80 rotates, the click plate 826 can be maintained in the state of having been fastened to the retaining member 834 rather than rotating along with the tension knob 80.

The click sound generating device 810 according to the ninth embodiment further includes a removal prevention ring 832 and the retaining member 834.

The removal prevention ring 832 is locked to a locking groove 80a which is formed in the circumferential inner surface of the tension knob 80. The removal prevention ring 832 holds the spring holder 812, the click spring 820 and the click plate 826 to prevent them from being undesirably removed from the tension knob 80.

The retaining member 834 is fastened to the side cover 68 which is assembled to the sidewall of the reel frame 60 of the bait reel. The stop holes 836 are formed in the circumferential inner surface of the retaining member 834 so that the stop protrusions 831 of the click plate 826 are inserted into the respective stop holes 836. Thereby, the retaining member 834 holds the click plate 826 such that the click plate 826 is prevented from rotating when the tension knob 80 rotates.

In the click sound generating device 810 according to the ninth embodiment having the above-mentioned construction, when the user rotates the tension knob 80, the spring holder 812 fastened to the tension knob 80 and the click spring 720 integrated with the inner surface of the spring holder 812 are rotated along with the tension knob 80. At this time, the contact protrusion 824 formed on the click spring 820 elastically moves along the uneven surface 828 of the click plate 826 fastened to the retaining member 834. Thereby, clicking sounds are generated.

As described above, in the present invention, a click sound generating device is installed in a drag knob or tension knob which controls the drag strength of a spool, so that the click sound generating device generates clicking sounds depending on rotation of the drag knob or tension knob. Therefore, the present invention enables a user to minutely and precisely control the drag strength or rotating speed of the spool.

Furthermore, a click spring and a click plate are installed in the drag knob or tension knob to generate clicking sounds so that the user can minutely and precisely control the drag strength or rotating force of the spool.

In addition, the click sound generating device of the present invention is configured such that a change of the structure of an existing bait reel is minimized and the assembly and manufacture of the bait reel with the click sound generating device is facilitated, thus enhancing the productivity, and reducing the number of defective products and failure rate of the device. Hence, the price competitive power can be enhanced. Particularly, the present invention can use even the components of existing reels without modifying their structure, thereby maximizing the price competitive power, and facilitating inventory management.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A click sound generating device for a bait reel, the bait reel comprising a reel frame, a spool rotatably mounted to the reel frame, with a fishing line wound around a circumferential outer surface of the spool, a handle connected to the spool through a gear shaft, and a drag knob provided between the handle and the gear shaft to adjust a drag strength of the spool, the click sound generating device being installed in the drag knob to generate clicking sounds depending on rotation of the drag knob, and comprising:
a click spring interlocked with the drag knob or the gear shaft, with a contact protrusion formed on the click spring, the click spring having an annular shape with a center opening so that the click spring is provided around a circumferential outer surface of the gear shaft through the center opening;
a click plate interlocked with the gear shaft or the drag knob, the click plate having an uneven surface having a crown gear shape to generate clicking sounds when the contact protrusion of the click spring comes into contact with and moves along the uneven surface of the click plate, the click plate having a center hole so that the click plate is fitted over the circumferential outer surface of the gear shaft through the center hole;
means for holding the click spring; and
means for retaining the click plate.

2. The click sound generating device as set forth in claim 1, wherein
the click spring is interlocked with the drag knob,
the click plate is interlocked with the gear shaft, and
the means for holding the click spring comprises a spring holder mounted to the drag knob.

3. The click sound generating device as set forth in claim 2, wherein the spring holder is integrated with the click spring and surrounds a circumferential outer surface of the click spring.

4. The click sound generating device as set forth in claim 2, wherein
   the gear shaft has a planar surface portion and a longitudinal slot, and
   the click plate or the spring holder that is interlocked with the gear shaft has a linear portion corresponding to the planar surface portion and a stop protrusion corresponding to the longitudinal slot, the linear portion and the stop protrusion being formed in the center hole of the click plate or a center hole of the spring holder.

5. The click sound generating device as set forth in claim 1, wherein
   the click spring is interlocked with the gear shaft,
   the click plate is interlocked with the drag knob, and
   the means for holding the click spring comprises a spring holder mounted to the gear shaft.

6. A click sound generating device for a bait reel, the bait reel comprising a reel frame, a spool rotatably mounted to the reel frame, with a fishing line wound around a circumferential outer surface of the spool, a side cover assembled to a sidewall of the reel frame, and a tension knob provided on the side cover, the tension knob applying tension to a spool shaft to adjust a speed at which the spool rotates,
   the click sound generating device being installed in the tension knob to generate clicking sounds depending on rotation of the tension knob, and comprising:
   a click spring interlocked with the tension knob or maintained in a stationary state when the tension knob rotates, with a contact protrusion formed on the click spring, the click spring having an annular shape with a center opening so that the click spring is provided around a circumferential outer surface of the spool shaft through the center opening;
   a click plate maintained in a stationary state or interlocked with the tension knob when the tension knob rotates, the click plate having an uneven surface having a crown gear shape to generate clicking sounds when the contact protrusion of the click spring comes into contact with and moves along the uneven surface of the click plate, the click plate having a center hole so that the click plate is fitted over the circumferential outer surface of the spool shaft through the center hole;
   means for holding the click spring; and
   means for retaining the click plate.

7. The click sound generating device as set forth in claim 6, wherein
   the click spring is interlocked with the tension knob,
   the click plate is maintained in the stationary state, and
   the means for holding the click spring comprises a spring holder mounted to the tension knob.

8. The click sound generating device as set forth in claim 7, wherein the spring holder is integrated with the click spring and surrounds a circumferential outer surface of the click spring.

9. The click sound generating device as set forth in claim 7, further comprising:
   a retaining member coupled to the side cover, the retaining member having a stop hole therein, wherein
   the click plate or the spring holder has a stop protrusion corresponding to the stop hole of the retaining member so that the click plate or the spring holder is maintained in the stationary state regardless of the rotation of the tension knob.

10. The click sound generating device as set forth in claim 6, wherein
    the click spring is maintained in the stationary state,
    the click plate is interlocked with the tension knob, and
    the means for holding the click spring comprises a spring holder mounted to the side cover.

* * * * *